United States Patent
Narayanan et al.

(10) Patent No.: US 7,206,859 B2
(45) Date of Patent: Apr. 17, 2007

(54) METHOD FOR OPTIMIZED LOCAL ROUTING BETWEEN MOBILE NODES

(75) Inventors: Vidya Narayanan, Schaumburg, IL (US); Tyrone D. Bekiares, Chicago, IL (US); Matthew C. Keller, Algonquin, IL (US); George Popovich, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 108 days.

(21) Appl. No.: 10/782,601

(22) Filed: Feb. 18, 2004

(65) Prior Publication Data

US 2005/0198372 A1 Sep. 8, 2005

(51) Int. Cl.
*G06F 15/16* (2006.01)
*G06F 15/173* (2006.01)

(52) U.S. Cl. .............. 709/238; 709/224; 709/239; 709/242; 709/245

(58) Field of Classification Search ............ 709/202, 709/238, 245, 224, 239, 242; 370/338, 349, 370/389
See application file for complete search history.

(56) References Cited

U.S. PATENT DOCUMENTS

| | | | | |
|---|---|---|---|---|
| 6,195,705 B1* | 2/2001 | Leung | | 709/245 |
| 6,484,211 B2* | 11/2002 | Turunen | | 709/245 |
| 6,636,498 B1* | 10/2003 | Leung | | 709/245 |
| 6,915,325 B1* | 7/2005 | Lee et al. | | 709/202 |
| 7,031,328 B2* | 4/2006 | Thubert et al. | | 370/401 |
| 2003/0149719 A1* | 8/2003 | Wang | | 709/202 |
| 2004/0032852 A1* | 2/2004 | Thubert et al. | | 370/349 |
| 2004/0093426 A1* | 5/2004 | Sahasrabudhe et al. | | 709/238 |
| 2004/0117339 A1* | 6/2004 | Thubert et al. | | 707/1 |
| 2004/0148428 A1* | 7/2004 | Tsirtsis | | 709/238 |
| 2004/0179532 A1* | 9/2004 | Thubert et al. | | 370/395.5 |
| 2004/0246931 A1* | 12/2004 | Thubert et al. | | 370/338 |
| 2006/0062214 A1* | 3/2006 | Ng et al. | | 370/389 |
| 2006/0171370 A1* | 8/2006 | Matsumoto et al. | | 370/351 |

OTHER PUBLICATIONS

Charles Perkins and David B. Johnson, Route Optimization in Mobile IP, Feb. 15, 2000, Mobile IP Working Group, Internet Draft, pp. 1-24.*
Perkins, et al., Route Optimization in Mobile IP; Mobile IP Working Group, Internet Draft; Feb. 25, 1999.
Wu, et al., Bi-directional Route Optimization in Mobile IP over Wireless LAN; Institute of Information Science, Taipei, Taiwan.
Network Working Group, C. Perkins, Ed., Nokia Research Center, Aug. 2002.
Cisco Systems, Inc., Mobile IP—Foreign Agent Local Routing to Mobile Networks, 2004; pp. 1-14.

* cited by examiner

*Primary Examiner*—Rupal Dharia
*Assistant Examiner*—Quang N. Nguyen
(74) *Attorney, Agent, or Firm*—Valerie M. Davis

(57) ABSTRACT

In a system (100) that includes at least one mobility server (40, 50), at least one edge mobility agent (60) and a plurality of mobile nodes (20, 30), a method for local routing between two mobile nodes that includes the steps of: receiving a first care-of address for a first mobile node; detecting an edge mobility agent having knowledge of the first care-of address; determining, based upon at least one condition, that the edge mobility agent can perform local routing of at least one datagram for the first mobile node; and instructing the edge mobility agent to perform local routing of at least one datagram between the first mobile node and a second mobile node that has a second care-of address that is known to the edge mobility agent.

9 Claims, 3 Drawing Sheets

METHOD FOR OPTIMIZED LOCAL ROUTING BETWEEN MOBILE NODES

FIELD OF THE INVENTION

The present invention relates generally to mobility management systems and more specifically to a method of optimized local routing between two geographically co-located mobile nodes.

BACKGROUND OF THE INVENTION

There has been an increasing use of mobility management systems that utilize a client/server approach to mobility management of hosts that are coupled to the system. One goal of these systems is to provide a solution for seamless mobility on a network such as, for instance, the global Internet or a private network, that is scalable, robust and secure, and that allows roaming hosts or "mobile nodes" (also referred to herein as "mobile clients") such as, for instance, radios, phones, laptops, PDAs, etc., to maintain ongoing communications while changing their point of attachment to the network. Specifically, each mobile node is always identified by its home address (regardless of its current point of attachment to the network), which provides information about its point of attachment to a home network. However, when the mobile node is connected to the network outside of its home network, i.e. when visiting a foreign network or a foreign domain, the mobile node is also associated with a care-of address that provides information about its current point of attachment. Those of ordinary skill in the art should realize that the term "care-of address" is not meant to be limited to any particular client/server mobility mechanism but covers other terms used in the art that describe a topologically correct address such as, for instance, a "point-of-presence address."

Typically, such systems include a plurality of mobility servers and edge mobility agents that utilize a protocol for facilitating the mobility management of the mobile nodes. The mobility server is an entity, for instance a router, on the mobile node's home network that tunnels datagrams (also known in the art as data packets) for delivery to the mobile node when it is away from home, and maintains current location information for the mobile node. The edge mobility agent is an entity, for instance a router, on the mobile node's visited network that provides routing services to the mobile node when the mobile node is registered with the edge mobility agent.

A mobile internet protocol ("mobile IP") enabled system is one well known example in the art of a mobility management system. Mobile IP provides for a registration process for registering a care-of address with a mobility server called a home agent ("HA") whose point of attachment, i.e., its IP address, is in the mobile node's home network. The home agent registration is what enables the home agent to send the datagrams destined for the mobile node, i.e., outbound datagrams, through a tunnel to the care-of address. After arriving at the end of the tunnel, each datagram is then delivered to the mobile node.

Registration may, for instance, be facilitated by an edge mobility agent called a foreign agent ("FA") whose point of attachment is in the visited network and whose IP address is the care-of address for the mobile node. The foreign agent de-tunnels and delivers datagrams to the mobile node that were tunneled by the mobile node's home agent. For datagrams sent by the mobile node, i.e., inbound datagrams, the foreign agent may serve as a default router for registered mobile nodes. The mobile node may, alternatively, obtain a co-located care-of address from the visited network and register that care-of address with its home agent. A foreign agent may or may not be present in the visited network. Even in the presence of a foreign agent, the registration may or may not go through the foreign agent on the visited network when the mobile node is operating with a co-located care-of address.

In accordance with standard mobile IP (defined herein as the implementation of mobile IP in accordance with Request for Comment ("RFC") 3344, i.e., MPv4), after a mobile node registers its care-of address for a foreign network with its home agent, outbound datagrams are always routed through its home agent to the care-of address. Thus, the source and destination IP address in the datagram are topologically correct because the endpoints of this forward tunnel (i.e., the home agent address and the care-of address) are properly assigned addresses for their respective locations. However, this is typically not the case for inbound datagrams. In accordance with standard mobile IP, inbound datagrams are typically sent to their destination using standard mobile IP based upon the destination address in the datagram header, i.e., not by source address. The source and destination IP address are topically incorrect in this case since the source IP address of a packet transmitted by the mobile node (i.e., the mobile node's home address) does not correspond to the network prefix from where it emanates.

Many routers today implement security policies such as "ingress filtering" that do not allow forwarding of packets that have a source address that appears topologically incorrect. In such environments, mobile nodes may use reverse tunneling with, for instance, the foreign agent supplied care-of-address as the source address. The reverse tunnel then starts at the mobile node's care-of address and terminates at the home agent, wherein it is then forwarded using standard mobile IP to the destination IP address. Thus, when reverse tunneling is used, both inbound and outbound datagrams go through the mobile node's home agent.

When reverse tunneling is used, it may, however, be a shortcoming to have all of the datagrams go through the mobile node's home agent. There may be some situations where peer-to-peer communications (i.e., wherein datagrams are not routed through a mobile node's home agent) may be desired when reverse tunneling is being implemented so as to prevent datagrams from been routed along paths that are significantly longer than optimal. For example, if a mobile node is visiting some subnet, even datagrams from another mobile node on the same subnet must be routed through the mobile node's home agent (on its home network), only then to be tunneled back to the original subnet for final delivery. This indirect routing delays the delivery of the datagrams to mobile nodes, and places an unnecessary burden on the networks and routers along their paths.

One way known in the art of implementing peer-to-peer communication when reverse tunneling is implemented is through route optimization. Route optimization provides a means for a correspondent node to maintain a binding cache containing the care-of address of one or more mobile nodes. When sending a datagram to a mobile node, if the sender has a binding cache entry for the destination mobile node, it may tunnel the datagram directly to the care-of address indicated in the cached mobility binding. In the absence of any binding cache entry, datagrams destined for a mobile node will be routed to the mobile node's home network and then tunneled to the mobile node's care-of address by the mobile node's home agent in accordance with standard mobile IP.

One shortcoming of route optimization is that it addresses only datagrams sent from a fixed correspondent node to a mobile node, and does not facilitate mobile node to mobile node routing. Another shortcoming of route optimization is that it requires changes to both the mobile and correspondent nodes. It is, however, unrealistic to expect all mobile and correspondent nodes to have support for this route optimization feature. Accordingly, many standard mobile IP nodes will not benefit by route optimization.

There is also known in the art a means for bi-directional route optimization. This solution teaches performing route optimization without requiring any change to correspondent nodes by using an entity known as a correspondent agent. However, this solution only addresses route optimization based on the home addresses of the correspondent nodes, which makes it beneficial only when the correspondent nodes are fixed. For correspondent nodes that are mobile, any routing done based on the home address is of no use, since packets are only going to be forwarded to the home network of that node.

Thus, there exists a need for a method for one mobile node to tunnel datagrams to a second mobile node, for instance on the same subnet, without the need for the datagrams to be first sent to the mobile node's home agent. It is further desirable that the solution be compatible with mobile IP.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
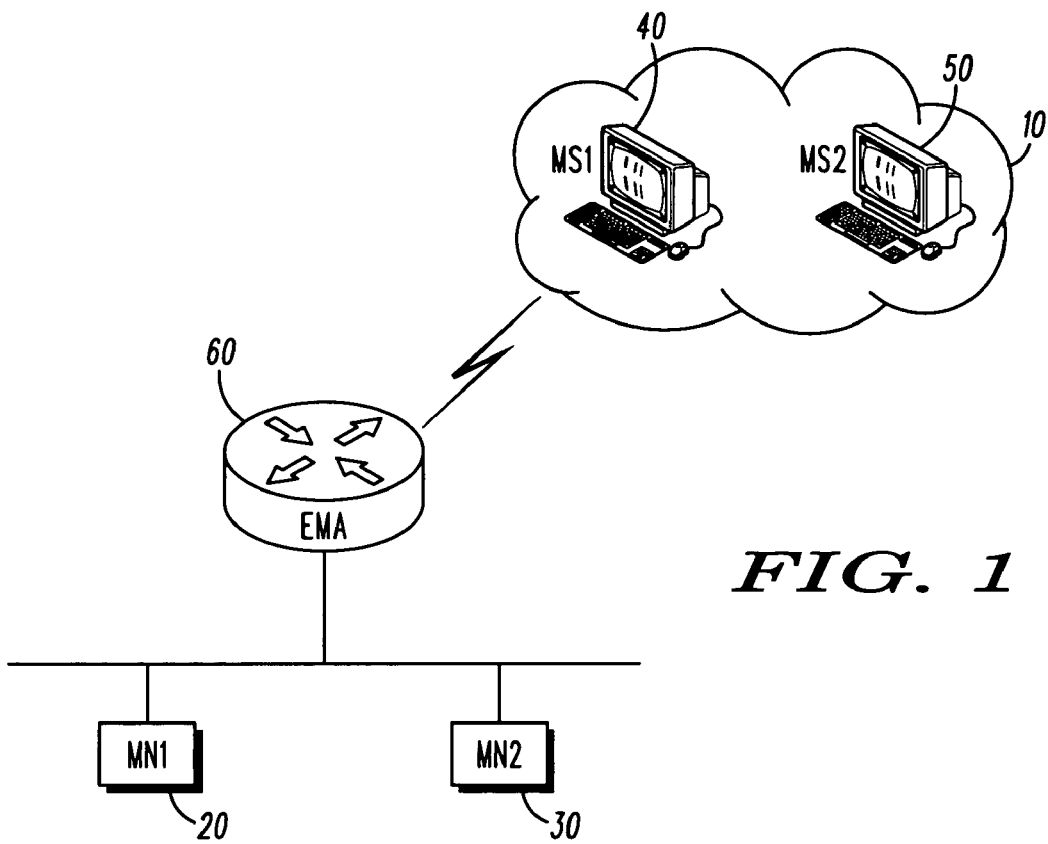
FIG. 1 illustrates a simple block diagram of an exemplary mobility management system that may be used to implement an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

FIG. 1 illustrates a simple block diagram of an exemplary mobile IP enabled system 100 that may be used to implement an embodiment of the present invention. Illustrated therein is a home network 10 for a mobile node (MN) 20 and a mobile node 30. Both mobile nodes 20 and 30 have a home address associated with its home network 10 such that when mobile nodes 20 and 30 are attached to the network in its home network, datagrams can readily reach mobile nodes 20 and 30 using standard mobile IP. Although FIG. 1 illustrates mobile nodes 20 and 30 as sharing a common home network, it should be understood by those of ordinary skill in the art that mobile nodes 20 and 30 may, alternatively, have different home networks that may be in the same domain or in different domains.

Included in network 10 is a mobility server (MS) 40, for instance, for mobile node 20 and a mobility server 50 for mobile node 30. Mobility servers 40 and 50 may each be, for instance, a home agent. Mobile node 20 must register a care-of address with mobility server 40 when its point of attachment is in a foreign network (i.e., a network other than network 10) so that mobility server 40 may tunnel datagrams destined to mobile node 20 to that care-of address. Likewise, mobile node 30 must register a care-of address with mobility server 50 when its point of attachment is in a foreign network (i.e., a network other than network 10) so that mobility server 50 may tunnel datagrams destined to mobile node 30 to that care-of address.

System 100 further includes an edge mobility agent (EMA) 60 that has a point of attachment in a foreign network, which may be in the same domain or a different domain from network 10. It should be understood by those skilled in the art that edge mobility agent 60 may be a stationary router in a stationary network, such as a foreign agent or an edge router or a mobile router in a mobile network. Edge mobility agent 60 may be used to facilitate registration of mobile nodes 20 and 30 with their respective mobility servers and may be further used to implement peer-to-peer communications (also referred to herein as "local routing" or "local repeat"), for instance between mobile nodes 20 and 30, in accordance with the present invention.

FIG. 1 is only representative of a mobility management system, and therefore, shows only a limited number of mobile nodes, mobility servers and edge mobility agents for purposes of ease of illustration. However, it should be understood by those of ordinary skill in the art that typically many more mobile nodes are attached to the system, along with stationary nodes. In addition, there are many more local networks and local domains, mobility servers and edge mobility agents included in the system. It should be further understood by those of ordinary skill in the art that the functionality of the mobility servers and the edge mobility agents (including the functionality described in and by reference to FIGS. 2–5) may be implemented in software or hardware, although the functionality is typically implemented in software.

Figure 2:
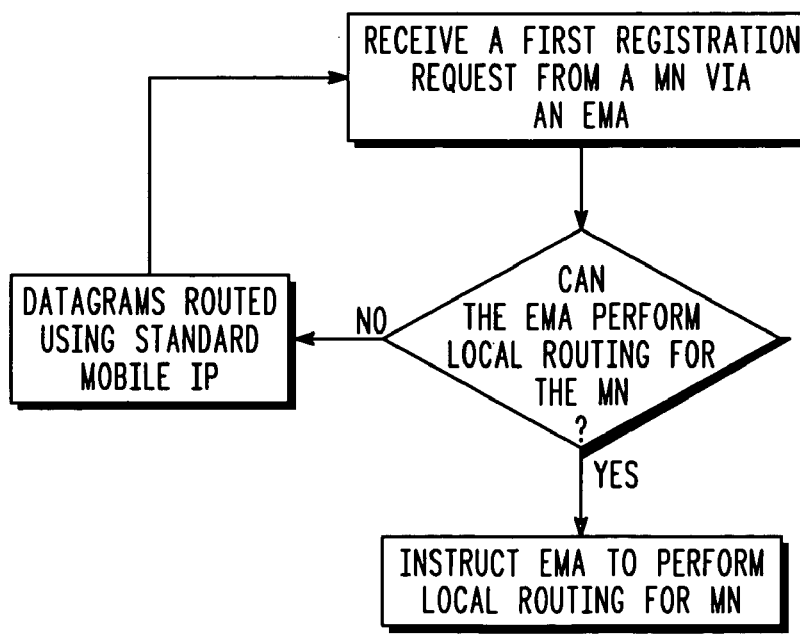
FIG. 2 illustrates a flow diagram of the signaling operation of a mobility server implementing local routing in accordance with an embodiment of the present invention.

FIG. 2 illustrates a flow diagram of the signaling operation of a mobility server, e.g. mobility server 40 or 50, implementing local routing in accordance with an embodiment of the present invention. In this embodiment, the mobility server is a home agent implementing the invention in accordance with mobile IP. However, those of ordinary skill in the art will realize that the present invention may just as easily be implemented using a mobility server providing IP subnet mobility to mobility clients utilizing a different, possibly proprietary, client-server based mobility management mechanism.

In accordance with the embodiment of the invention illustrated in FIG. 2, the home agent may authorize local routing between two or more mobile nodes (e.g., mobile nodes 20 and 30 of FIG. 1) known to a common edge mobility agent, i.e., in the context of mobile IP, for example, the care-of-addresses of the mobile nodes are known to the foreign agent, and they thereby generally share a common subnet. Typically, the mobile nodes are known to the edge mobility agent as a result of registering with their respective mobility servers through the edge mobility agent. However, there may be alternate ways in which the edge mobility agents can discover the mobile nodes. For example, the mobility server can inform the edge mobility agent about the presence of a certain mobile node on its network. The edge mobility agent in this mobile IP embodiment may be, for instance, a foreign agent, a mobile router or an edge router.

Returning to FIG. 2, the home agent receives a first care-of address for a mobile node. The care-of address may, for instance, be included in a registration request from a mobile node via an edge mobility agent using standard mobile IP, upon the mobile node first switching to this edge mobility agent. After detecting an edge mobility agent that has knowledge of this care-of address, perhaps based on information in the registration request or by using other conventional means, the home agent then determines, based upon at least one condition, whether this edge mobility agent can perform local routing of at least one datagram for the mobile node, wherein the datagram would be sent from the mobile node to a second mobile node also known to the edge mobility agent, without the datagram needing to be tunneled to the mobile node's home agent. Since the edge mobility agent is aware of both mobile nodes' care-of addresses, it can tunnel the datagram based upon both of these care-of addresses so that the source and destination WP addresses are topologically correct.

In determining whether the EMA can perform local routing for a mobile node, the home agent may analyze one or more conditions. For instance, the home agent may determine or detect whether the EMA has local routing capabilities, i.e., whether the EMA is configured with intelligence to perform the local routing functionality. This information may be exchanged a priori between the EMA and the home agent. For instance, the EMA, upon power up, may let the home agent know about its local routing capability, for instance through a separate message from the EMA to the home agent. Alternately, this information may be sent with every registration message. Assuming that the EMA has this local routing capability, this functionality may be, for instance, based on a "local repeat mode" being made operable in the EMA to enable the EMA to locally route datagrams for a portion of or all mobile nodes known to it. In such a case, the home agent might determine whether local routing should be performed for this particular mobile node, for instance, based upon detecting whether a need exists. Whether the need exists may depend upon one or more factors or upon information available to the home agent. Such factors and information may include, but are not limited to, whether the mobile node is part of an incident scene, whether the mobile node is engaged in video sessions that don't necessarily need to be routed through the home agent, etc.

If the one or more conditions exist such that the EMA can perform local routing for the mobile node, the home agent instructs the EMA to do so, for instance through extensions in the registration reply. The home agent may also let the EMA know about this local routing instruction by sending a separate message to the EMA. Otherwise, the datagrams will be routed to and from the mobile node using standard mobile IP. In addition to the instruction to locally route for the mobile node, the home agent may also communicate one or more local routing conditions upon which this local routing will be based. For instance, the home agent may instruct the EMA to locally route all packets except, say, voice packets. There may be a need for the home agent to receive certain packets for logging or other purposes. When such conditions exist, the home agent may communicate those conditions to the EMA.

Figure 3:
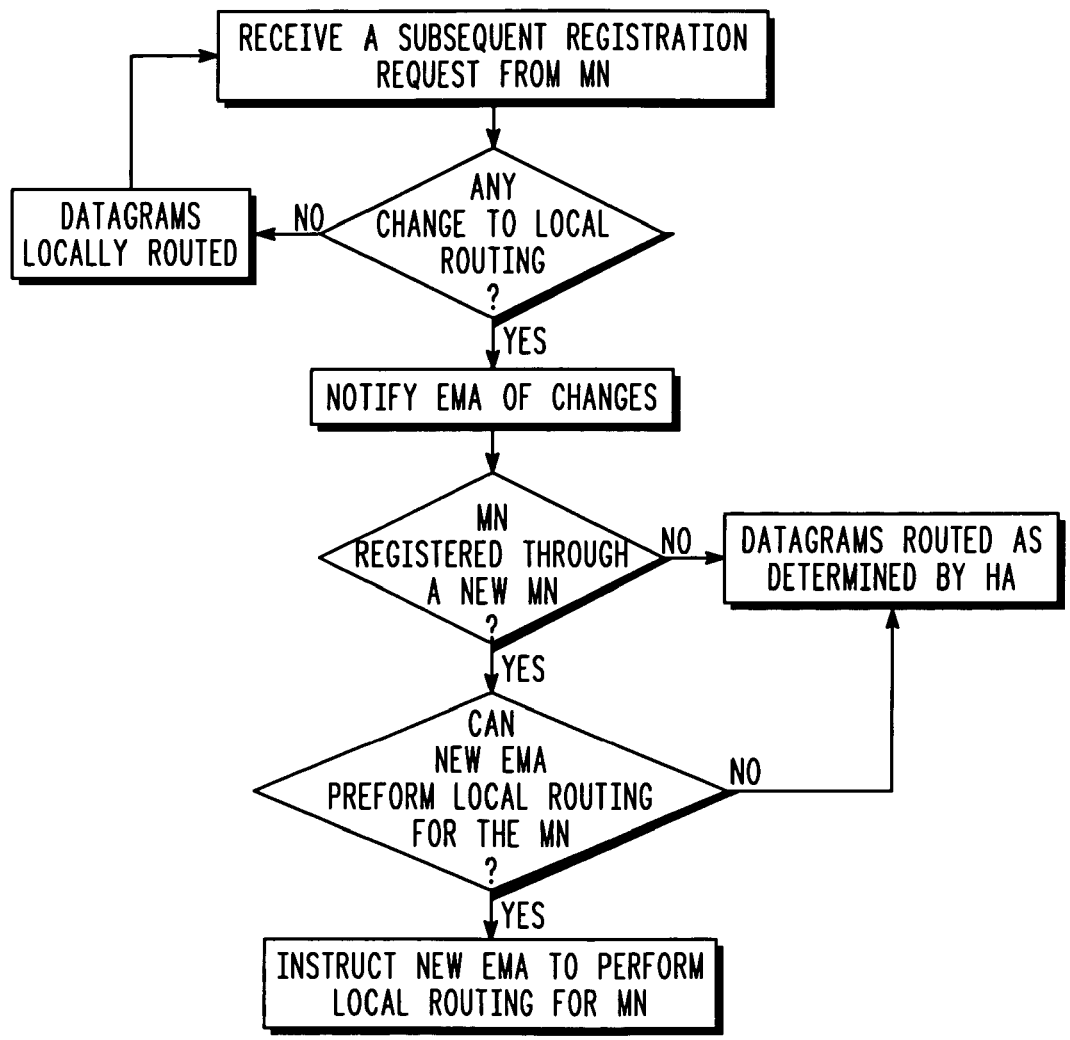
FIG. 3 illustrates a flow diagram of the signaling operation of a mobility server implementing local routing in accordance with an embodiment of the present invention.

FIG. 3 illustrates a flow diagram of the signaling operation of a mobility server, e.g. mobility server 40 or 50, implementing local routing in accordance with an embodiment of the present invention. In this embodiment, the mobility server is a home agent implementing the invention in accordance with mobile IP. However, those of ordinary skill in the art will realize that the present invention may just as easily be implemented using a mobility server utilizing a proprietary mobility management mechanism such as one mentioned above.

Let's assume in this embodiment that an EMA is performing local routing for a mobile node. The home agent may determine if there is any change in the local repeat function for the edge mobility agent. This determination may be triggered, for instance, by the mobile node sending a subsequent registration request to the home agent. The subsequent registration request may have been sent as a result of the mobile node refreshing its registration with the home agent before the lifetime of the registration expires. Alternatively, the mobile node may have sent the registration request to notify its home agent of a new care-of address, as a result of the mobile node changing its point of attachment to the network.

If the registration request was to refresh that mobile node's registration with its home agent, then the home agent may determine whether the need for local routing continues to exist. For example, the need for local routing for the mobile node may no longer exist because the mobile node is no longer a part of the incident scene. The home agent may also determine whether any of the conditions incident with the local routing should change although the EMA will continue to perform local routing for the mobile node. If the subsequent registration request from the mobile node was to notify the home agent that the mobile node had changed its point of attachment, local routing for the mobile node would change if the present EMA would no longer perform local routing for the mobile node.

If there is no change in local routing for the mobile node, the EMA continues to locally route datagrams for the mobile node under the current conditions. However, if the home agent detects any change in the local routing for the mobile node, the home agent informs the edge mobility agent of the change. The home agent may also determine if the mobile node is known by a new EMA, e.g., as indicated by a change in care-of address in the subsequent registration request. If the mobile node has not changed edge mobility agents, the current EMA will just continue to route datagrams for the mobile node as determined by the home agent, taking into consideration any changes to the local routing.

If the mobile node is known by a new EMA, then the home agent determines whether this new EMA can perform local routing for the mobile node. This determination can, for instance, be made in the same manner as it was made with respect to the first EMA as described by reference to FIG. 2, which for the sake of brevity will not be repeated here. If the new EMA cannot perform local routing for the mobile node, then the EMA will route datagrams in accordance with this determination, i.e., the EMA will route datagrams for the mobile node in accordance with standard mobile IP. Conversely, if the EMA can perform local routing for the mobile node, the home agent instructs the EMA to perform local routing and also communicates any conditions associated with that local routing.

FIG. 2 and FIG. 3 illustrate embodiments of the present invention from the perspective of a mobility server, e.g., a home agent. The remaining FIGS. 4–5 illustrate an embodiment of the present invention from the perspective of an edge mobility agent.

Figure 4:
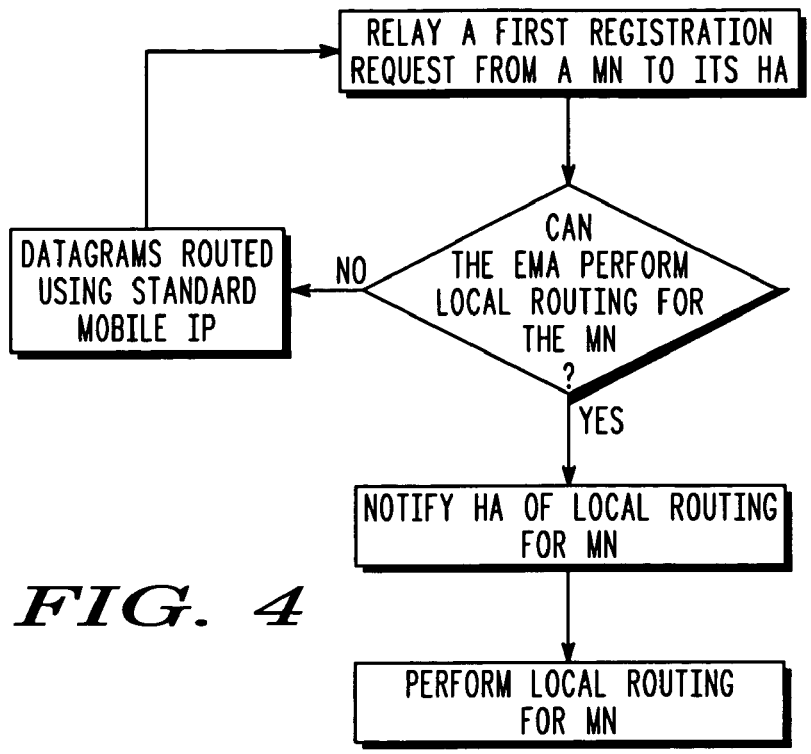
FIG. 4 illustrates a flow diagram of the signaling operation of an edge mobility agent implementing local routing in accordance with an embodiment of the present invention.
Figure 5:
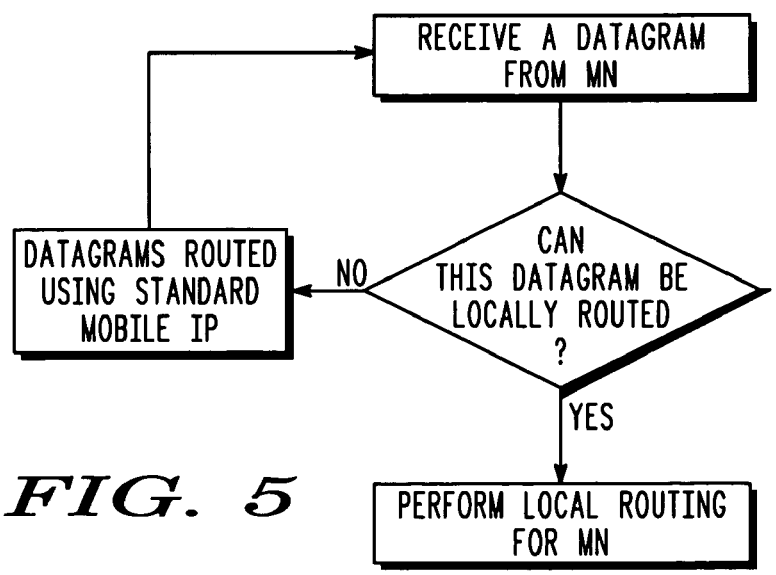
FIG. 5 illustrates a flow diagram of the data processing operation of an edge mobility agent implementing local routing in accordance with an embodiment of the present invention.

Specifically, FIG. 4 illustrates a flow diagram of the signaling operation of an edge mobility agent, e.g. edge mobility agent 60, implementing local routing in accordance with an embodiment of the present invention. In this embodiment, the edge mobility agent may be a foreign agent, a mobile router or an edge router implementing the invention in accordance with mobile IP. However, those of ordinary skill in the art will realize that the present invention may just as easily be implemented using an edge mobility agent utilizing a different, possibly proprietary, mobility management mechanism such as one mentioned above.

In a first embodiment of the present invention illustrated by reference to FIG. 4, the edge mobility agent is not configured for making a decision of whether to locally route for the mobile nodes known to the edge mobility agent. Instead, the home agent makes that decision in a manner described above by reference to FIGS. 2 and 3. Thus, in accordance with such an embodiment, the edge mobility agent receives an indication of a care-of address for a mobile node. This indication may be received, for instance, as a result of a registration request being sent from a mobile node to the mobile node's home agent via the EMA, upon the mobile node first switching to the EMA, or via some other conventional means. In this way, the mobile node becomes known to the EMA.

The EMA then determines whether it can perform local routing for the mobile node. In this instance, this comprises a simple determination of whether it has received from the home agent an instruction to locally route datagrams for the mobile node, for instance through the registration reply. If the EMA fails to receive the instruction from the home agent to perform local routing for the mobile node, the EMA routes datagrams for the mobile node in accordance with standard mobile IP. However, if the home agent instructs the EMA to locally route datagrams for the mobile node, the EMA proceeds to do so. The EMA may also optionally notify the home agent that it will perform local routing for the mobile node or the home agent may assume based upon its instruction that the EMA is performing local routing for the mobile node. The EMA's notification to the home agent is typically in the form of an ACK (i.e., acknowledgement) well known in the art. Moreover, the step of performing local routing for the mobile node may include, for instance, adding the mobile node to a local routing list.

In a second embodiment of the present invention illustrated by reference to FIG. 4, the edge mobility agent is configured for making the decision of whether to locally route for the mobile nodes known to the edge mobility agent. The edge mobility agent may make this decision in a similar manner as the home agent, which was described above by reference to FIGS. 2 and 3. Accordingly, the edge mobility agent might determine whether local routing should be performed for this particular mobile node, for instance, based upon whether a need exists. Whether the need exists may depend upon one or more similar factors, as described above, or upon information available to the edge mobility agent. The edge mobility agent may, for instance, also examine itself to see whether it currently has the bandwidth to perform local routing for that particular mobile node, assuming the EMA is limited by a predetermined capacity.

If the edge mobility agent determines that it can perform local routing for the mobile node, the EMA proceeds to do so, which may include but is not limited to adding the mobile node to a local routing list and locally routing datagrams on a packet-by-packet basis, for instance, in accordance with the method illustrated in FIG. 5. The EMA may also optionally notify the home agent that it will perform local routing for the mobile node, or the home agent may assume or be notified by other means known in the art that the EMA is performing local routing for the mobile node. However, if the edge mobility agent determines that it cannot perform local routing for the mobile node, the EMA routes datagrams for the mobile node in accordance with standard mobile IP.

Let's assume in this embodiment that the edge mobility agent is performing local routing for the mobile node. Accordingly, the edge mobility agent may check to see whether there is any change in its local repeat function for the mobile node. In one embodiment, the home agent makes the determination as to such changes as described above by reference to FIG. 3, and communicates these changes to the EMA. In another embodiment, the EMA may make this determination in a manner similar to the home agent. If there is no change in local routing for the mobile node, the EMA continue to locally route datagrams for the mobile node under the current conditions. However, if there is any change in the local routing for the mobile node, the edge mobility agent implements these changes.

FIG. 5 illustrates a flow diagram of the data processing operation of an edge mobility agent implementing local routing for a mobile node in accordance with an embodiment of the present invention. In this embodiment, the edge mobility agent may be a foreign agent, a mobile router or an edge router implementing the invention in accordance with mobile IP. However, those of ordinary skill in the art will realize that the present invention may just as easily be implemented using an edge mobility agent utilizing a different, possibly proprietary, mobility management mechanism such as one mentioned above.

FIG. 5 shows the edge mobility agent receiving a datagram from a mobile node for which the EMA is performing local routing, for instance for a mobile node that is on its local routing list. The edge mobility agent then determines whether the datagram can be locally routed. For instance, the edge mobility agent may check to see if it also performs local routing for the destination mobile node by, for instance, determining if the destination mobile node is also on its local routing list. The edge mobility agent may then check to see if local routing is needed for this particular datagram. Not all datagrams may be sent via local repeat mode even though the mobile node is on the local routing list. Certain conditions may be applied to make the decision on local routing for a datagram. For example, datagrams from certain applications may always be required to be sent to the home agent for monitoring or logging purposes. Such conditions may either be configured in the edge mobility agent or communicated to it via the home agent or some other entity. Once the need for local repeat is determined, the edge mobility agent routes the datagram locally. If there is no need for local repeat or if the datagram is required to be sent to the home agent, the edge mobility agent routes the datagram via standard mobile IP.

The incoming packet, when it is reverse tunneled by the mobile node, will have its outer tunnel source address as the mobile node's care-of-address and the destination address as the home agent's care-of-address. The inner tunnel source and destination addresses of the packet will be the home address of the mobile node and the home address of the second mobile node respectively. The edge mobility agent will have to look into the inner tunnel header and replace the outer header accordingly to have the source and destination addresses respectively as the home agent's IP address and the care-of-address of the second mobile node. In the case where the reverse tunnel ends at the edge mobility agent, the packets incoming from the mobile node will only have one IP header (the same as the inner tunnel described above) and the edge mobility agent would simply have to send that packet to the second mobile node without any changes.

One example where the present invention may be used is in public safety deployments, for instance, where a mobile node wants to receive a video feed from an IP camera connected to another mobile node known to the same EMA, and the backhaul is a narrowband pipe. Normally, if the backhaul cannot tolerate streaming video, such applications will not be possible, since the video would have to travel all the way to the home agent and back out to the mobile node. However, with the present invention, this application becomes possible, since the video will not have to be sent over the narrowband backhaul link to the home agent. Instead, the mobile router, the foreign agent or the edge router to which both mobile nodes are known can locally route the video, thereby enabling this application.

The present invention has been described with respect to a mobility management system that utilizes mobile IP. However, it should be understood by those of ordinary skill in the art that the present invention may also be used in systems that use a different client-server based (maybe proprietary) mobility management mechanism. For instance, as long as there is a mobility server in the system that handles mobility management for clients, and as long as the clients inform the mobility server of their IP point of attachment, this invention can be applied. The EMA functionality may be added to an edge router in the absence of an EMA device as part of the mobility management mechanism.

The present invention has a number of advantages over the prior art, including but not limited to the following. The present invention bases route optimization on the care-of address of the mobile node and hence provides a method of route optimization between two mobile nodes. Also, by allowing synchronization between the mobility server and the edge mobility agent, additional enhancements are possible, including but not limited to: per-packet local routing decisions; having the mobility server control the decisions as desired; having the mobility server inform an edge mobility agent of when local routing has changed for a mobile node, for instance, to effect faster recognition to the EMA of when a mobile node moves and is no longer serviced by that EMA; etc.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. In a system comprising at least one mobility server, at least one mobile router and a plurality of mobile nodes, a method for local routing between two mobile nodes comprising the steps of:
   receiving a first care-of address for a first mobile node;
   detecting a mobile router having knowledge of said first care-of address, the mobile router supporting a mobile network and further being capable of changing its point of attachment within or between networks;
   determining, based upon at least one condition, that the mobile router is configured to perform local routing of at least one datagram from the first mobile node to a second mobile node that has a second care-of address that is known to the mobile router, without the at least one datagram being tunneled through a mobility server;
   instructing said mobile router to perform local routing of at least one datagram between said first mobile node and the second mobile node;
   detecting at least one change in local routing for said first mobile node based on a new first care-of address for said first mobile node;
   notifying said mobile router of said at least one change in local routing for said first mobile node;
   detecting a second mobile router having knowledge of said new first care-of address;
   determining, based upon at least one condition, that the second mobile router can perform local routing of at least one datagram for said first mobile node; and
   instructing said second mobile router to perform local routing of at least one datagram between said first mobile node and a third mobile node that has a third care-of address that is known to said second mobile router.

2. The method of claim 1, wherein said method is implemented using standard mobile internet protocol.

3. The method of claim 1, wherein said first care-of address is included in a registration request from said first mobile node.

4. The method of claim 3, wherein said mobile router is instructed to perform local routing via a registration reply responsive to said registration request.

5. The method of claim 1, wherein said at least one condition includes at least one of:
   detecting that said mobile router is configured for performing local routing; and
   detecting a need for local routing for said first mobile node.

6. The method of claim 1 further comprising communicating to said mobile router at least one local routing condition.

7. The method of claim 1, wherein performing local routing includes adding said first mobile node to a local routing list.

8. The method of claim 1, wherein performing local routing includes:
   receiving a first datagram from said first mobile node to said second mobile node;
   determining that said first datagram can be locally routed; and
   locally routing said first datagram from said first mobile node to said second mobile node.

9. A mobility server configured for performing the method of claim 1.

* * * * *